United States Patent [19]

Wagenknecht

[11] 3,834,060

[45] Sept. 10, 1974

[54] FISH HOOK
[76] Inventor: Leonard Wagenknecht, P.O. Box 282, Sterling, Ill. 61081
[22] Filed: Feb. 21, 1973
[21] Appl. No.: 334,477

[52] U.S. Cl. ............................................. 43/44.8
[51] Int. Cl. ............................................ A01k 83/06
[58] Field of Search .............. 43/44.8, 44.82, 44.4

[56] References Cited
UNITED STATES PATENTS
| | | | |
|---|---|---|---|
| 2,148,074 | 2/1939 | Kaspick | 43/44.8 |
| 2,330,517 | 9/1943 | Rigandi | 43/44.8 |
| 2,668,387 | 2/1954 | Gallardo | 43/44.4 |
| 2,825,174 | 3/1958 | Leinonen | 43/44.8 |

*Primary Examiner*—G. E. McNeill

[57] ABSTRACT

A fish hook member composed of a single wire strand including a hook end and a loop end and an elongated shank extending between the hook of the hook end and loop. A second shank extends from the loop alongside but spaced from the aforementioned shank and terminating in a barbed end generally at the mouth of the hook between the elongated shank and hook.

8 Claims, 3 Drawing Figures

PATENTED SEP 10 1974 3,834,060

FISH HOOK

BACKGROUND OF THE INVENTION

There have, in the past, been provided fishing hooks in which there is provided an auxiliary or second barbed member for holding a minnow on the hook without using the hook itself. Such is shown in Gallardo U.S. Pat. No. 2,668,387 and Hampton U.S. Pat. No. 1,791,723. The problem with this type of hook is that attachments have been made on standard-type hooks and as a consequence the cost of the hook has been out of proportion to its value. For example, in the aforesaid Hampton patent, the second shank which holds the minnow is welded or fixed to the main hook and a latch is provided much like a safety pin so that the shank holding the minnow may be held close to the shank of the hook. In the Gallardo patent, the second shank with the barbs is a complete attachment to a standard hook and they must be manually placed together, and consequently there is prevented the automatic making or manufacturing of the hook which places the price of the hook considerably greater than is necessary and at which the market will tolerate.

SUMMARY OF THE INVENTION

With the above in mind, it is the purpose of the present invention to provide a fish hook composed of a single wire strand with one end forming a barb in the hook and having a first shank extending to a looped portion at the opposite end of the hook and a second shank that is integral with and extends from the loop in substantially parallel fashion to the first shank and terminates at the mouth of the hook and substantially opposite the barbed end of that hook.

By so forming the hook from a single wire strand, the entire hook may be made from a single operation and the natural disposition is for the short or second shank, when a minnow is attached, to hold the minnow against the first shank to thereby prevent release of the minnow. Also, the loop will not only serve the purpose of attaching a fishing line, but will also operate as a small torsion spring to permit separation of the two shanks for placing a minnow on the shank. The spring or loop will, of course, bias the second shank towards the first or longer shank and again the fish will be held on the hook.

It is also proposed to provide, as a modification of the invention, a hook that has from the center of the hook portion of an otherwise normal hook a second shank that extends parallel to the shank of the hook and which has additional barbs thereon. This will permit the minnow to be placed on the second shank and be held thereon. The second shank or minnow shank is integral with the hook.

DESCRIPTION OF THE PREFERRED EMBODIMENT

Figure 1:
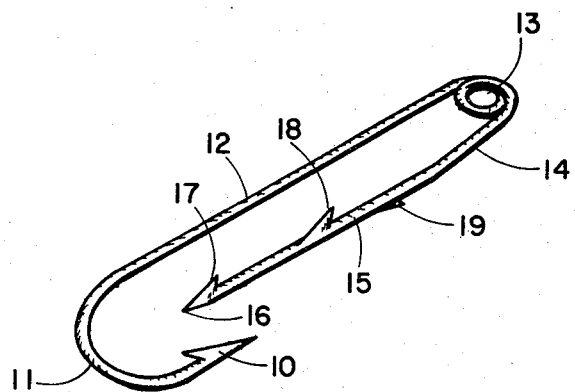
FIG. 1 is a perspective view taken at one end and to the side of a fish hook.
Figure 2:
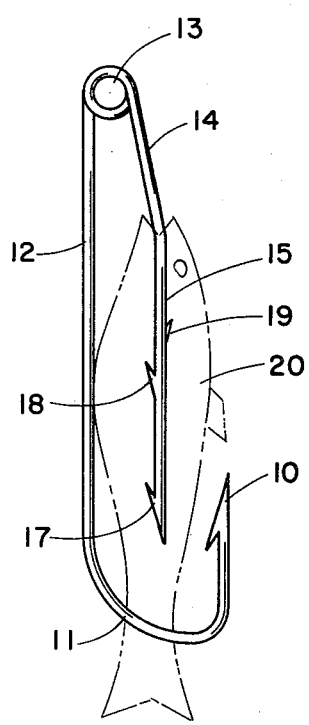
FIG. 2 is a side view of the fish hook shown in FIG. 1 with a minnow mounted thereon.

The fish hook shown in FIGS. 1 and 2 is composed of a single wire strand having a barb 10 at one end and extending from the barb in arcuate fashion to form a hook 11 so as to define one end of the hook. From the hook 11, the single wire extends in a shank 12 to a loop 13 in the wire which defines the opposite end of the hook structure. The loop 13 has at least one complete hoop and terminates in a portion 14 extending somewhat diagonally outwardly to a second shank 15 which is parallel to the shank 12. The shank 15 extends to the opposite or terminal end of the wire 16 and has thereon a barb 17 directed toward the loop. Additional barbs 18, 19 are provided on the shank 15.

Reviewing FIG. 2, it will be noted that the shank 15 besides being parallel to the shank 12 generally extends midway between the spacing between the barb 10 and the shank 12 and terminates at the mouth of the hook 11. Thus, the barbs 10 and 17 are substantially opposite one another and the spacing between the barbs 10 and 17 is substantially equal to the distance between the barb and the shank 12. It will also be noted, as shown in FIG. 1, that the shanks 12, 15 ends 10 and 17 and loop 13 are generally coplanar to one another with the obvious exception that there is a slight lateral offset at the loop 13 to accommodate the two widths of wire. However, the diagonal portion 14 is so shaped to again place the shanks 12, 15 in coplanar relation with the hook 11.

In operation, the minnow, as indicated at 20 in FIG. 2, is placed on the second or shorter shank 15 with the mouth of the minnow facing the loop 13. The barbs 17-19 will hold the minnow on the second shank 15. The loop 13 as well as the characteristics of the entire wire structure will tend to resume its normal position. However, the loop 13 will operate somewhat as a torsion spring to permit some distorting of the hook structure and particularly of the shank 15. However, when the minnow is attached, there will be a pressure against the fish from the shank 12 to thereby aid in holding it on the shank 15. By placing the fish on the second shank 15, it will rest higher on the hook thereby causing the game fish to get hooked deeper when it attacks the minnow.

Also, the hook of the present invention will somewhat preserve the minnow making it somewhat difficult for the smaller fish to nibble without biting onto the hook 11. The minnow 20 will often not be destroyed when the fish strikes the hook.

Figure 3:
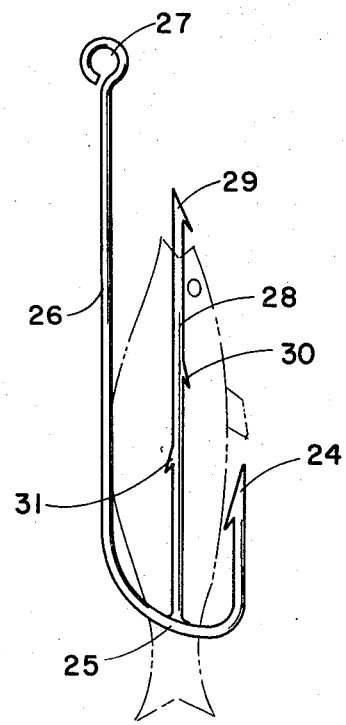
FIG. 3 is a side view of a modified form of the invention.

Referring now to FIG. 3, there is provided a modified form of the invention. The hook therein shown is of a conventional nature having a hook end 25 with a barb 26 at its extremity and a shank 26 that extends from the hook 25 up to an eyelet 27 on the opposite end of the hook. Integral with and extending from the inside of the hook 25 is a second shank 28 that is parallel to the shank 26 and which extends substantially three-quarters of the distance between the loop 25 and eyelet 27. The second shank 28 has barbs 29, 30, 31 thereon. As is clearly evident from viewing FIG. 3, a minnow may be forced over the second shank 28 to thereby expose the barb 26 and the hook 25. The nature of the wire or metal in the shank 28 will permit some distortion of the shank 28 and should an extremely large minnow be applied to the shank 28, the hook portion 25 may also be distorted somewhat to permit entry of the minnow on the hook 28. However, once the minnow is on the shank 28, the inherent characteristics of the shank 28 and the hook 25 will tend to spring the minnow against the shank 26 making it very difficult for the minnow to be dislodged from the shank 28.

I claim:

1. A fishing hook structure composed of a singular wire-like member with a loop at one end, a pair of wire sections disposed substantially parallel to one another with at least one wire section extending with a shank from the loop and having a hook end extending and in curved-like fashion around an end of the other wire section to a barbed end, and the other wire section is spaced from said shank a distance substantially midway between the barbed end and shank and has a barb at its free end.

2. The invention as set forth in claim 1 in which said other wire section has its end that is opposite to its free end integrally connected to the hook end of said one wire section.

3. The invention as set forth in claim 1 in which said other wire section is integral with and extends from the loop to its free end, and the free end terminates at the mouth of the hook end of the said one wire section.

4. A fishing hook structure composed of a singular wire having a small coil-like loop therein forming one end of the hook structure and a pair of wire sections extending from the loop generally alongside but spacedly from one another with one wire section terminating at an end with a barb thereon and the other wire section extending from the loop and having a hook end portion extending arcuately around but spaced from the aforesaid end to thereby form the loop portion of the hook and terminating at a hook end opposite but spaced from the aforesaid end, said hook end having a barb thereon.

5. The fishing hook structure as set forth in claim 4 characterized by the end of said one wire section being disposed substantially centrally with respect to the hook end portion of said other wire section and by said first wire section having a plurality of barbs formed on the surface thereof and spaced lengthwise along the wire section.

6. A fish hook member composed of a single wire member having a barb at a first end and extending from the barb in curved fashion to form a hook portion with the end and from thence in a relatively long substantially first straight shank offset from the end to at least one complete loop and from the loop in a second shorter substantially straight shank substantially parallel to the first shank and terminating at an end offset from the first end but within said hook, said second shank having barbs thereon facing opposite to the direction of the barb on the first end.

7. The fish hook member as set forth in claim 6 further characterized by the hook, first and second shanks, both ends and said loop being substantially coplaner except for the minor offset created by the forming of the loop.

8. The fish hook member as set forth in claim 6 further characterized by the second shank and end being spaced from the first shank substantially one-half the distance between the first end and first shank.

* * * * *